United States Patent [19]
Aizawa

[11] Patent Number: 5,078,397
[45] Date of Patent: Jan. 7, 1992

[54] GOLF CLUB HEAD

[75] Inventor: Yuichi Aizawa, Kodaira, Japan

[73] Assignee: Daiwa Golf Co., Ltd., Tokyo, Japan

[21] Appl. No.: 631,203

[22] Filed: Dec. 21, 1990

Related U.S. Application Data

[63] Continuation of Ser. No. 363,991, Jun. 9, 1989, abandoned.

[30] Foreign Application Priority Data

Jun. 16, 1988 [JP] Japan ................. 63-148491

[51] Int. Cl.⁵ ............................................. A63B 53/04
[52] U.S. Cl. ..................................... 273/78; 273/169; 273/173; 273/DIG. 23; 273/DIG. 7
[58] Field of Search ............ 273/167 R, 167 H, 167 J, 273/173, 77 A, 77 R, 78, DIG. 7, DIG. 23, 167 A, 167 F, 167 G, 169-175

[56] References Cited

U.S. PATENT DOCUMENTS

| | | | |
|---|---|---|---|
| 4,630,826 | 12/1986 | Nishigaki et al. | 273/167 H |
| 4,664,383 | 5/1987 | Aizawa | 273/78 |
| 4,667,963 | 5/1987 | Yoneyama | 273/78 |
| 4,697,814 | 10/1987 | Yamada | 273/169 |
| 4,754,975 | 7/1988 | Aizawa | 273/169 |

FOREIGN PATENT DOCUMENTS

| | | | |
|---|---|---|---|
| 58-159769 | 9/1983 | Japan | 273/78 |
| 64-2675 | 1/1989 | Japan | 273/171 |
| 64-85679 | 3/1989 | Japan | 273/167 R |

Primary Examiner—Edward M. Coven
Assistant Examiner—Sebastiano Passaniti
Attorney, Agent, or Firm—Kalish & Gilster

[57] ABSTRACT

The present invention relates to a golf club head and a method of making the same. The golf club head has a reinforced fiber member integrally formed with metal or resin which forms a metal or resin layer positioned in a front face. In the method for making the golf club head of the present invention, the reinforced fiber member is disposed on the front face side of the insert core, then under the state that the reinforced fiber member is pressed to be fixed against the insert core by a mold, the molten metal or resin is flown into the space formed between the reinforced fiber member and the insert core, thereby integrally forming the reinforced fiber member with the above metal or resin.

11 Claims, 7 Drawing Sheets

GOLF CLUB HEAD

This is a file wrapper continuation of application Ser. No. 07/363,991, filed June 9, 1989, now abandoned.

BACKGROUND OF THE INVENTION

The present invention relates to golf club heads and a method of making the same.

Generally, a golf club head is required to have strength sufficient to resist an impact and also a function to hit a ball a long distance.

A two-piece hard ball was developed in recent years, and the impact force of the ball against a golf club head was increased. This caused easy deformation or breakage of the golf clubs if they were made of a conventional material. Consequently, it has been desired to develop impact resistant materials.

To hit the ball a long distance, it is important to heighten a restitution coefficient at the moment of impact. Thus, the club face is required to possess a high strength.

Further, golf club heads desirably weigh ranging from about 200 g to about 300 g. A shot performance varies largely depending on the characteristics of the club head such as a position of the center of gravity, moment of inertia, and the shape of hitting face, even if the clubs having the same weight are used. Therefore, the golf club head is significantly required to be able to be designed freely so that the above characteristics can be controlled. In view of this, the club head is desired to be light weighted.

The club face is also required to possess corrosion resistance in view of locations where the club is used as well as the above characteristics.

Golf club heads which meet in part the existing demands are disclosed for example in Japanese Patent Application Laid-open Print No. 60-88570, Japanese Utility Model Application Laid-open Print No. 60-155556, Japanese Utility Model Application Laid-open Print No. 60-155557, and Japanese Patent Application Laid-open Print No. 61-209676.

FIG. 16 shows a golf club head disclosed in Japanese Patent Application Laid-open Print No. 60-88570. This club head has a hitting area 13 which is made of fiber-reinforced metal fixed with screws 15 in its front face 11.

This conventional golf club head, however, has possibility that the hitting area 13 comes off because the hitting area 13 made of a fiber reinforced metal is fixed to the front face 11 with the screws 15. The hitting area 13 looks incompatible with the neighboring area and may cause a dead sound.

To remedy such defects, a reinforced fiber member was integrally formed with the front face 11 by casting or the like, but, such a reinforced fiber member was dispersely contained in the molten metal to be cast. Consequently, it was difficult to increase the fiber content in view of formability problems, and it was difficult to use long fibers. In addition, there was a problem that it was difficult to dispose the reinforced fiber member at a specific position of the front face 11.

SUMMARY OF THE INVENTION

An object of the present invention is to provide golf club heads possessing greatly improved strength and reliability in the front face as compared with conventional ones.

Another object of the present invention is to provide golf club heads which can thoroughly remedy possible defects such as coming off of a hitting area, feeling of incompatibility of the hitting area, and occurrence of a dead sound.

Still another object of the present invention is to provide a method of making golf club heads in which a rein forced fiber member can be intensively disposed in the front face.

A further object of the present invention is to provide a method of making golf club heads in which the reinforced fiber member can be intensively disposed in a particular position of the front face without increasing the fiber content, and also with use of long fibers.

The golf club heads according to the present invention have a metal or resin layer formed on the outer sides of an insert core section to form the front and back faces in which the metal or resin layer positioned in the above front face is disposed with the reinforced fiber member which is integrally formed with the above metal or resin forming the above layer.

In the method of making the golf club heads of the present invention, the front face of the insert core has the reinforced fiber member disposed, and with this reinforced fiber member pressed to be fixed to the insert core with a metal mold, the molted metal or resin is filled in the space formed between the aforementioned reinforced fiber member and the insert core to integrally form the aforementioned reinforced fiber member together with the metal or resin.

In the golf club heads of the present invention, for the metal or resin layer positioned in the front surface, the reinforced fiber member is integrally formed with the metal or resin forming the above layer.

According to the method of making the golf club heads of the present invention, the front face of the insert core has the reinforced fiber member disposed, and with this reinforced fiber member pressed to be fixed to the insert core by means of a metal mold, the molted metal or resin is filled in the space formed between the reinforced fiber member and the insert core to integrally form the reinforced fiber member with the above metal or resin.

DESCRIPTION OF PREFERRED EMBODIMENT

The embodiments of the present invention will be described in detail with reference to the attached drawings.

Figure 1:
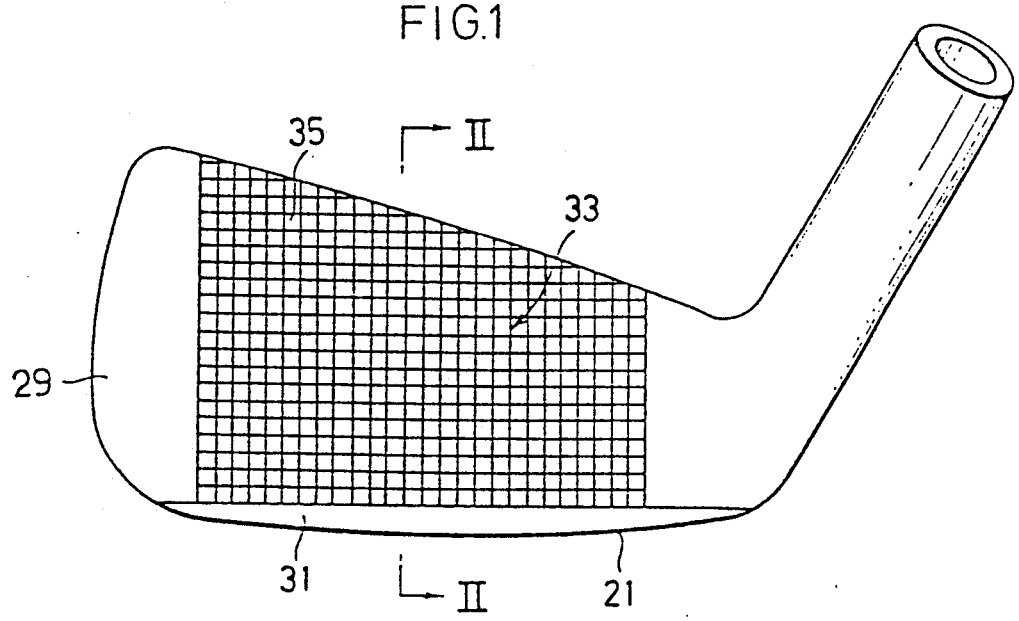
FIG. 1 is a front view showing one embodiment of the golf club head of the present invention.
Figure 2:
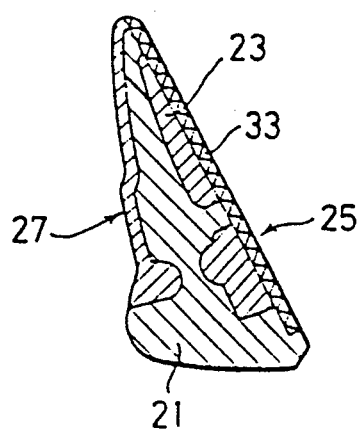
FIG. 2 is a transverse sectional view taken on line II—II of the golf club head of FIG. 1.

FIG. 1 and FIG. 2 show one embodiment of the golf club head of the present invention. This embodiment shows that the present invention is applicable to an iron club head.

In these drawings, reference numeral 21 shows an insert core made of stainless steel for example.

This insert core 21 has on its outside a metal layer 23 which is made of AC-8A aluminum alloy for example. A front face 25 and a back face 27 are formed.

In this embodiment, the metal layer 23 positioned in the front face 25 has a reinforced fiber member 33 which is integrally formed with the metal forming the above layer excluding a toe 29 and a sole 31.

Specifically, in this invention, metal forming the metal layer 23 is immersed into reinforced fibers 35 forming the reinforced fiber member 33 so as to be disposed in an integral from of the reinforced fiber member 33 and the metal.

Figure 3:
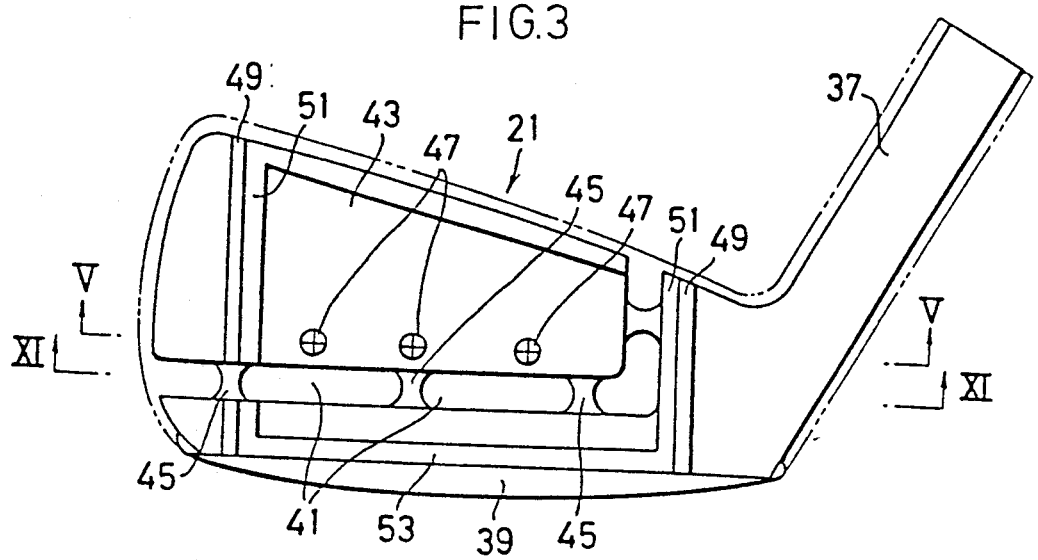
FIG. 3 is a side view showing an insert core of the golf club head of FIG. 1.

FIG. 3 shows the insert core 21 in detail. This insert core 21 has oblong spaces 41 formed in the longitudinal direction above a sole 39 continuing from a hosel 37.

Above the spaces, a weight setting block 43 is disposed as integrally and continuously formed with a supporting piece 45.

The weight setting block 43 has three bosses 47 at certain intervals in the horizontal direction, and both its sides are provided with convex parts 49 in the vertical direction. Grooves 51, 53 are formed through the convex part 49 and above the sole 39.

In the drawing, a two-dot and dash line shows the exterior of the golf club head when the metal layer 23 is formed in the insert core 21.

Figure 4:
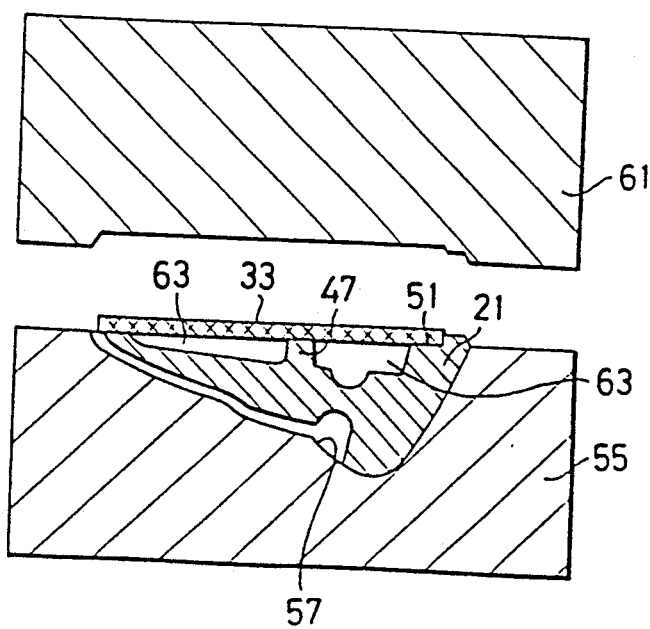
FIG. 4 is a vertical sectional view showing the insert core as accommodated in a metal mold.

The golf club head constructed as described above is produced as follows:

Specifically, as shown in FIG. 4, the insert core 21 is accommodated in a concave 57 formed in the bottom part 55 of a mold with the front face 25 facing upward, then the reinforced fiber member 33 is placed on the upper face of the insert core 21.

Figure 5:
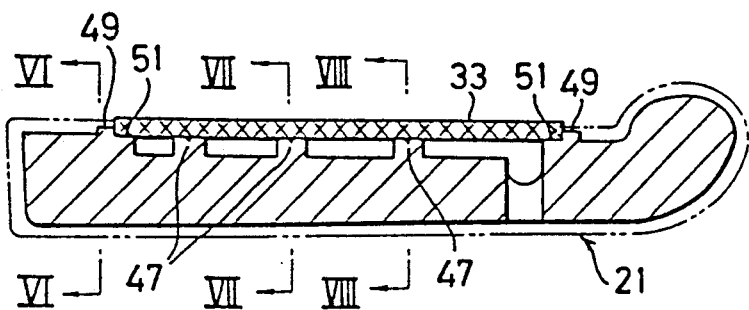
FIG. 5 is a vertical sectional view taken on line V—V of the gold club head of FIG. 3.

Under the above condition, the reinforced fiber member 33 is carried by three bosses 47 as shown in FIG. 5, and its both sides are positioned in grooves 51 of the convex parts 49 formed on both sides of the weight setting block 43. The bottom end is positioned in the groove part 53 formed above the sole 39.

The reinforced fiber member 33 has a thickness of about 20 mm for example, and since it is processed by grinding, it is disposed to protrude for example about 1.0 mm from the convex part 49 and to secure a grinding allowance of about 0.2 mm.

Figure 6:
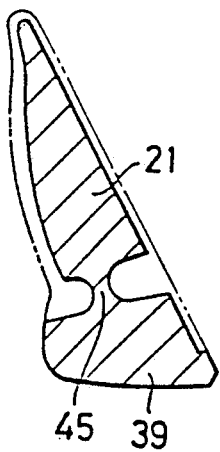
FIG. 6 to FIG. 8 are transverse sectional views taken on lines VI—VI, VII—VII, and VIII—VIII of FIG. 5.
Figure 7:
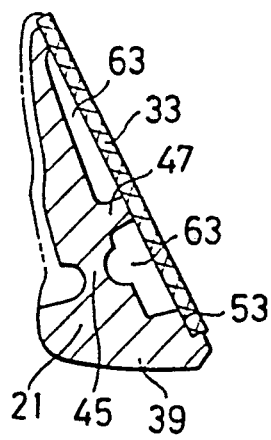
Figure 8:
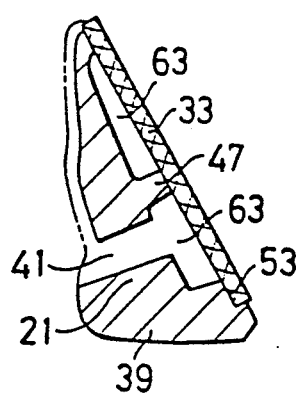

Under this state, the transverse sectional views taken on lines VI—VI, VII—VII and VIII—VIII of FIG. 5 are shown in FIG. 6 through FIG. 8.

Figure 9:
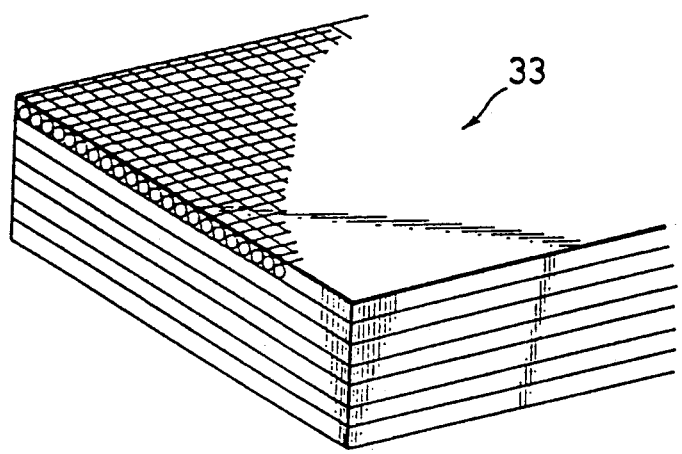
FIG. 9 to FIG. 10 are perspective views showing reinforced fiber members.
Figure 10:
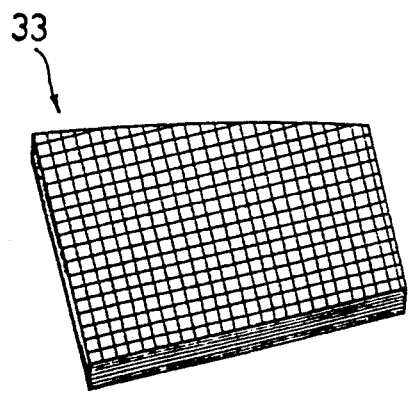

In these embodiments, the reinforced fiber member 33 is formed, for example, by laminating a plurality of long fibrous plain weave fabrics of SiC as shown in FIG. 9 and the top and bottom faces of the laminated fabrics have a glass cloth disposed thereon to make a sheet, which is cut into a certain form as shown in FIG. 10.

Figure 11:
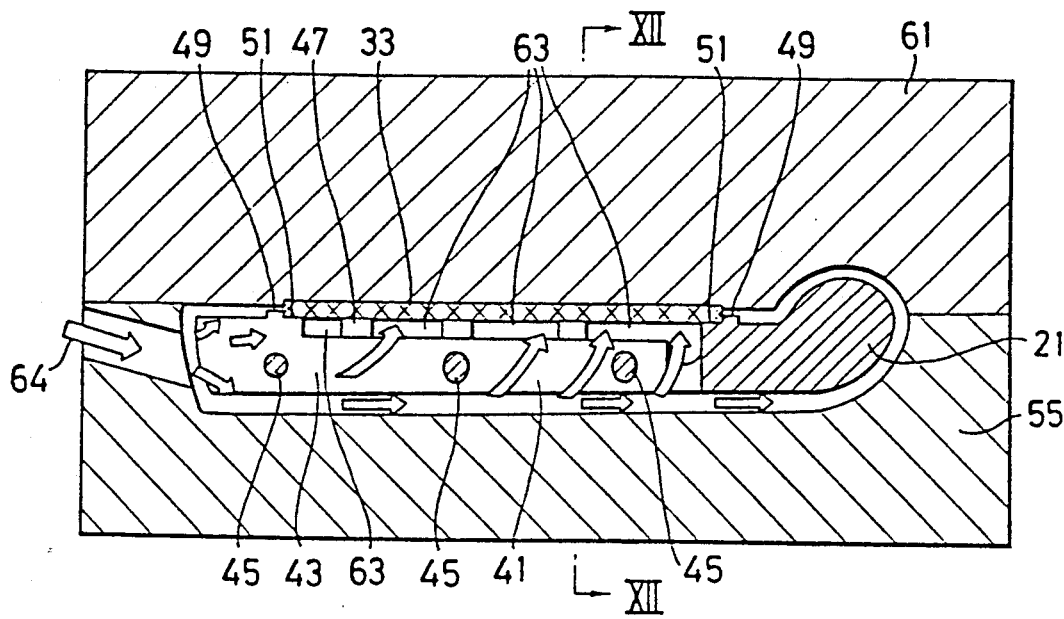
FIG. 11 is an explanatory view showing a part taken on line XI—XI of FIG. 3 which shows the golf club head of FIG. 1 under casting.

Then, as shown in FIG. 11, the reinforced fiber member 33 is pressed to be fixed in the insert core 21 with the top half 61 of the mold. In this condition, the molten metal is flown into a space 63 formed between the reinforced fiber member 33 and the insert core 21, so that the metal is immersed into the reinforced fiber 35 of the reinforced fiber member 33 to be integrally formed with the reinforced fiber member 33.

Figure 12:
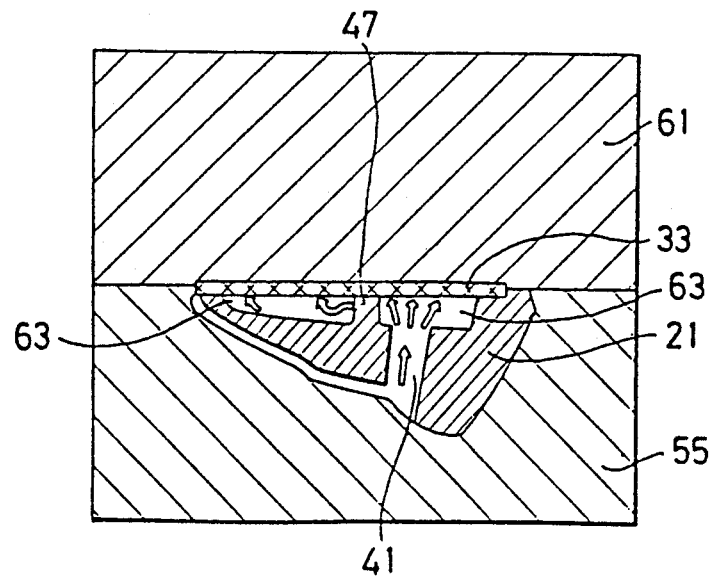
FIG. 12 is a sectional view taken on line XII—XII of FIG. 11.

In this embodiment, the molten metal supplied into the mold is, as indicated by the arrows in FIG. 11 and FIG. 12, flowed into the bottom half 55 of the mold from a gate 64 formed in the bottom half 55 of the mold, then flows through the space 41 formed between the weight setting block 43 in the insert core 21 and the sole 39, and is supplied into the space 63 formed between the reinforced fiber member 33 and the insert core 21.

Thus, in the golf club head structured as described above, the metal layer 23 positioned in the front face 25 has the reinforced fiber member 33 which is integrally formed with the metal forming them, thereby being capable of extensively improving the strength and reliability of the front face 25 as compared with the conventional ones.

More specifically, the golf club head made as described above does not need to have the hitting area made of the fiber reinforced metal screwed to the front face as before, so that it is thoroughly possible to remedy possible separation of the hitting area, incompatibility of the hitting area, generation of a dead sound, etc.

In the method of making the golf club head as described above, the front face 25 of the insert core 21 has the reinforced fiber member 33 disposed, then this reinforced fiber member 33 is pressed to be fixed against the insert core 21 by means of the top half 61 of the mold, and in this condition, the molten metal is flowed into the space 63 formed between the reinforced fiber member 33 and the insert core 21 to integrally form the metal and the reinforced fiber member 33, thereby being capable of disposing the reinforced fiber member 33 in the front face 21 intensively.

Specifically, according to an existing method of making a golf club head, the reinforced fiber member was dispersed into the molten metal before casting, requiring an increase of ratio of fiber in view of a molding problem, and it was difficult to use long fibers, and also the reinforced fiber member was hardly disposed intensively in a secure position of the front face. On the other hand, the method of the present invention effects casting in a state that the reinforced fiber member 33 is previously disposed in the insert core 21. Consequently, without increasing the ratio of fiber, and even if long fibers were used, it is possible to intensively dispose the reinforced fiber member 33 in a certain position of the front face 21.

Figure 13:
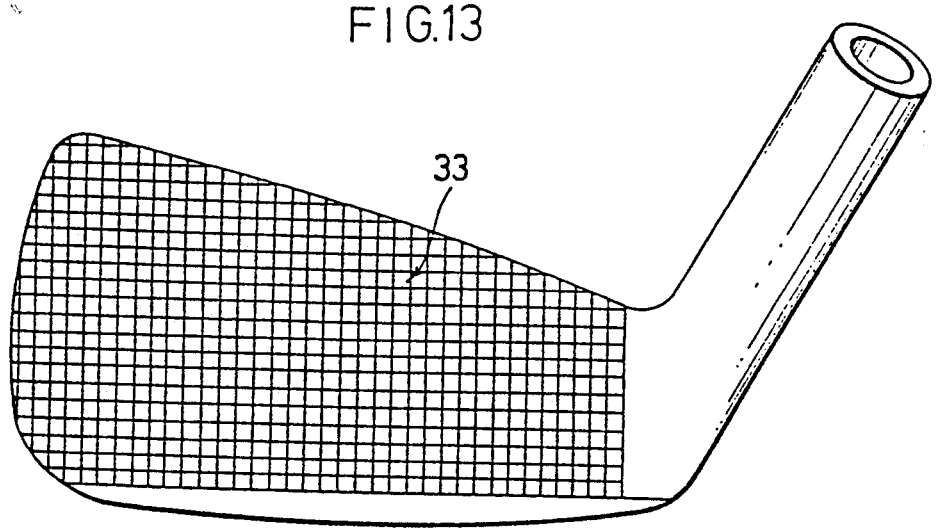
FIG. 13 is a side view showing another embodiment of the golf club head of the present invention.

FIG. 13 shows another embodiment of the gold club head of the present invention. In this embodiment, the reinforced fiber member 33 is disposed in the toe part of the front face.

In the golf club head structured as described above, the effects almost same with those attained by the embodiment shown in FIG. 1 can be attained.

Figure 14:
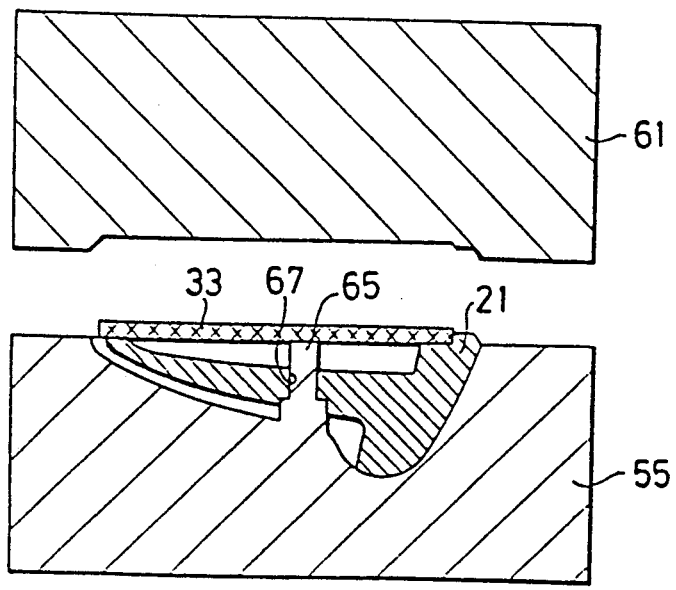
FIG. 14 is an explanatory view of another embodiment of the method of making the gold club head of the present invention.

FIG. 14 shows another embodiment of the method of making the golf club head of the present invention, and in this embodiment, the insert core 21 is not provided with bosses 65, and the boss 65 formed in the lower half 55 of the mold is inserted into a through hole 67 of the insert core 21, so that the reinforced fiber member 33 is supported by the top end of the boss 65.

In such a method of making a golf club head, the effects substantially same with those in the embodiment shown in FIG. 4 can be attained.

In this embodiment, the through hole 67 is positioned to include the center of gravity of the golf club head, and after forming, an energy tube is embedded or a heavy or light material can be put into it to adjust its performance.

Figure 15:
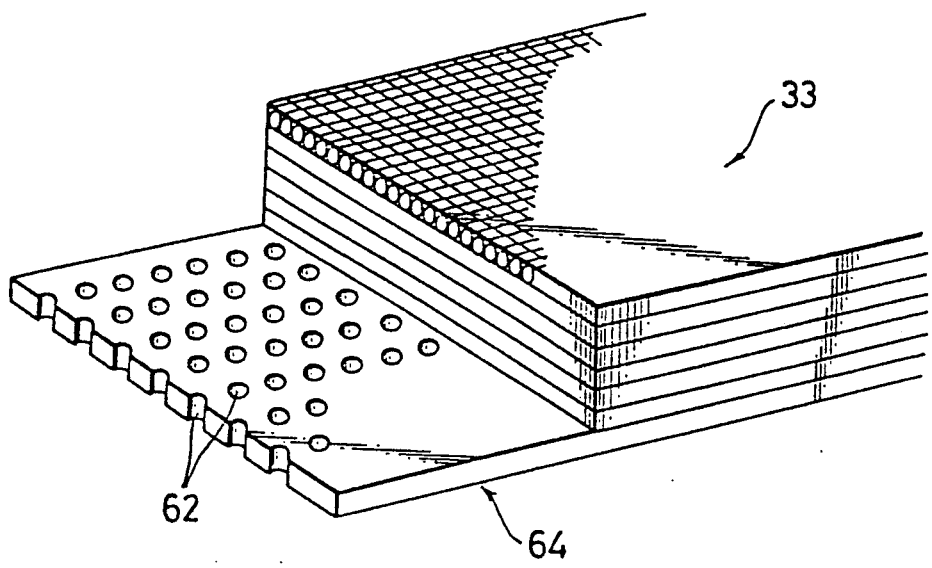
FIG. 15 is an explanatory view of an additional embodiment of the method of making the golf club head of the present invention.
Figure 16:
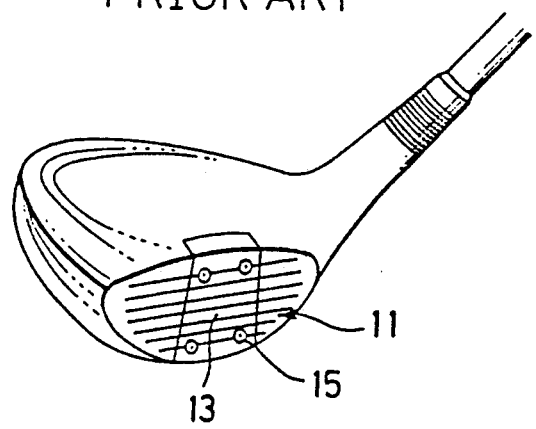
FIG. 16 is an explanatory view showing a conventional golf club head.

FIG. 15 shows still another embodiment of the method of making the gold club head of this invention. In this embodiment, the bottom layer of the reinforced fiber member 33 is formed of a plate 64 with a plurality of pores 62 formed. When this reinforced fiber member 33 is used, the plate 64 is pressed with the boss 47 of the insert core 21, so that the plate 64 is prevented from moving by the flow of the molten metal during casting, or the reinforced fiber member 33 can be thoroughly prevented from moving.

The same effect can be attained by forming the plate 64 separately from the reinforced fiber member 33.

In such a method of making the golf club head, the effects same as those in the embodiment shown in FIG. 4 can be attained.

In the embodiment described above, the insert core 21 having the metal layer 23 formed on its outside is described, but the present invention is not limited to such an embodiment. It is needless to describe that a resin layer formed of for example polycarbonate resin, ABS resin, epoxy resin, polyester resin, etc. can be similarly used on the outside of the insert core 21.

In the above embodiments, the metal layer 23 is formed of aluminum, but the present invention is not limited to such an embodiment. For example, magnesium, titanium, copper and other metals can be used. Besides, these base metals can naturally contain inorganic or organic reinforced fibers therein to prepare a composite material.

Furthermore, in the above embodiments, an example of forming the reinforced fiber member 33 using SiC fiber is described, but, the present invention is not limited to such an example. For example, there can be used carbon fiber, boron fiber, silicone carbide fiber, alumina fiber, silica fiber, glass fiber, aramide fiber, and stainless steel fiber, too.

In the above mentioned embodiments, the reinforced fiber member 33 was described in the form of a sheet. The present invention is not limited to that embodiment. For example, aluminum alloys or the like may be impregnated and compression-molded to form a plate for use.

In this case, the material for impregnation metal is not necessarily required to be identical with the metal layer material.

What is claimed is:

1. A golf club head; the golf club head comprising:
   a.) a core defining a sole and a toe of the golf club head and having bosses formed on a front surface thereof;
   b.) a front face formed of fiber-reinforced metal and a back face formed from a material layer selected from the group consisting of metal and resin, the front face being at least partly in direct over-laying contact with the core to thereby prevent backward movement of the front face when the golf club head strikes a golf ball;
   c.) a reinforced fiber member which overlays the front face and is formed in direct contact with the material of the front face, the reinforced fiber member being supported by the bosses of the core and terminating spacially within the extent of the toe and sole; and
   d.) filling material selected from the group consisting of resin and metal and having been formed in place from a molten state for filling spaces defined between the core and front face around the bosses, and between the core and the back face; whereby to provide a golf club head, the front face of which is supported by the core for superior strength and reliability.

2. A golf club head according to claim 1, wherein the metal of the material layer is selected from the group consisting of aluminum, magnesium, titanium, and copper.

3. A golf club head according to claim 1, wherein the resin of the material layer is selected from the group consisting of polycarbonate resin, ABS resin, epoxy resin, and polyester resin.

4. A golf club head according to claim 1, wherein the reinforced fiber member is selected from the group consisting of SiC fiber, carbon fiber, boron fiber, silicone carbide fiber, alumina fiber, silica fiber, glass fiber, aramide fiber, and stainless steel fiber.

5. A golf club head according to claim 1, wherein the reinforced fiber member is made by laminating a plurality of long-fiber plain weave fabrics of SiC, disposing glass cloth on top and bottom surfaces thereof to make a sheet, and cutting the sheet into certain form.

6. A golf club head according to claim 1, wherein the reinforced fiber member has a bottom layer formed of a porous plate.

7. A golf club head according to claim 1, wherein the core is formed to define spaces extending longitudinally above the sole defined thereby, the core forming, also, a hosel from which the sole continues, the core further being provided with a weight-setting block formed integrally therewith and supporting pieces of the core.

8. A golf club head according to claim 7, wherein the weight-setting block of the core is formed to have the bosses of the core for supporting the reinforced fiber member in an intermediate portion thereof, and the core has upper and lower grooved portions supporting corresponding upper and lower peripheral portions of the reinforced fiber member, there being spaces surrounding the bosses of the core for receiving flow of said filling material in a molten state.

9. A golf club head according to claim 1, wherein the bosses defined by the core for supporting the reinforced fiber member are defined in an intermediate portion of the core, and the core has upper and lower grooved portions supporting corresponding upper and lower peripheral portions of the reinforced fiber member, there being spaces surrounding the bosses of the core for receiving flow of said filling material in a molten state.

10. A golf club head according to claim 1, wherein the core defines a through-hole for receiving a boss of the mold inserted through the rear of the core for supporting the reinforced fiber member in an intermediate portion thereof, the core having upper and lower grooved portions supporting corresponding upper and lower peripheral portions of the reinforced fiber member, there being spaces surrounding the boss of the mold for receiving flow of said filling material in a molten state.

11. A golf club head according to claim 10, wherein the through-hole includes the center of gravity of the head.

* * * * *